United States Patent [19]

Müller et al.

[11] Patent Number: 4,877,328
[45] Date of Patent: Oct. 31, 1989

[54] INTERNAL MIXER

[75] Inventors: Friedhelm Müller, Freudenberg; Klaus Ruthenberg, Ronnenberg, both of Fed. Rep. of Germany

[73] Assignee: Continental Aktiengesellschaft, Hannover, Fed. Rep. of Germany

[21] Appl. No.: 183,564

[22] Filed: Apr. 12, 1988

[51] Int. Cl.$^4$ ............................ B01F 7/02; B01F 15/02
[52] U.S. Cl. ........................................ 366/76; 366/77; 366/97
[58] Field of Search ............... 366/76, 77, 97, 150, 366/183, 189, 192, 194, 196, 71, 72, 75, 69; 425/201, 204, 209, 583, 585, 584, 590; 91/392, 405, 508, 533, 534, 417 R, 511, 512, 403; 92/85 R, 143, 146

[56] References Cited

U.S. PATENT DOCUMENTS

| | | | |
|---|---|---|---|
| 1,516,488 | 11/1924 | Banbury | 366/150 X |
| 2,972,774 | 2/1961 | MacLeod | 366/77 X |
| 3,038,692 | 6/1962 | Holmes | 92/146 X |
| 3,050,002 | 8/1962 | Harris | 92/146 X |
| 3,057,008 | 10/1962 | Hartmann et al. | 366/76 |
| 3,363,514 | 1/1968 | Ramcke | 91/405 X |
| 3,695,587 | 10/1972 | DeMarco | 366/77 |

FOREIGN PATENT DOCUMENTS

| | | | |
|---|---|---|---|
| 57-59739 | 4/1982 | Japan | 366/97 |
| 58-24427 | 2/1983 | Japan | 366/69 |
| 485542 | 5/1938 | United Kingdom | 366/76 |

Primary Examiner—Harvey C. Hornsby
Assistant Examiner—Scott J. Haugland
Attorney, Agent, or Firm—Becker & Becker, Inc.

[57] ABSTRACT

Internal mixer with hydraulic cylinders (31 to 34) that are symmetrically disposed about the charging hopper (2). The floating weight (20) is driven via a movable crosspiece (22) and a shaft (21) for the floating weight. A low overall construction of the internal mixer is achieved. In the mixing operation position of the floating weight (20), the upper piston chambers (41) communicate with a first pressure reservoir (64), and the lower piston chambers (42) communicate with a second pressure reservoir (78), so that the hydraulic actuating mechanism (30) effects a resilient retention of the pistons (40) and hence of the floating weight (20), which therefore can retreat resiliently in the mixing operation position relative to the material that is to be mixed.

9 Claims, 6 Drawing Sheets

INTERNAL MIXER

BACKGROUND OF THE INVENTION

The invention relates to an internal mixer having a mixer housing in which are disposed mixing means and which has a charging opening that can be closed off by a press or floating weight, with a charging hopper being placed on the charging opening and being provided with at least one closeable filling opening, with the floating weight being guided in an upwardly and downwardly slidable manner in the charging hopper, and being movable between various positions in the hopper via a hydraulic actuating mechanism that includes pistons, piston rods, and piston chambers, with a hydraulic control mechanism being associated with the actuating mechanism.

Such internal mixers are used for procedures in the preparation of plastic materials, especially rubber, with the plastic materials and the additives being successively introduced into the internal mixers, where they are thoroughly mixed, kneaded or masticated, and finally discharged. During these procedures, considerable forces act upon the floating weight; however, these forces must not lead to swinging or tilting of the hydraulic actuating mechanism.

Pursuant to a known internal mixer of the above identified type (DE 34 26 442 C1 in the name of Manfred Stähr and dated Dec. 5, 1985), the floating weight is secured to the movable cylinder housing, while the piston and the piston rods are secured via spherical mountings to a construction that is secured to the housing and that contains a cross member and a tie rod. This construction projects upwardly to a relatively great extent in conformity to the maximum extension length of the hydraulic actuating mechanisms; this can have an adverse impact upon the transverse transport of materials in the plant where the internal mixer is located. If the internal mixer is to have an overall height that corresponds to the operating height of the crane above the floor, it is no longer possible to move the crane over the internal mixer. While pneumatioally driven internal mixers have a certain buffering resilience of the floating weight during the mixing operation—and for this reason have to accept the drawback of greater energy losses due to the pneumatic operation—hydraulically driven internal mixers of the previously known type are to a certain extent stiff or inflexible; in other words, the floating weight can hardly yield at all when impacts are encountered during the mixing operation.

It is an object of the present invention to provide an internal mixer that has a hydraulic actuating mechanism and that has a relatively compact construction, whereby however the hydraulic guidance of the piston and its piston rod should remain free from surrounding influences in the charging hopper. Furthermore, the floating weight, despite its hydraulic drive, should be floatingly held in the mixing operation position, such as upon a buffer.

SUMMARY OF THE INVENTION

Pursuant to a first aspect of the invention, the floating weight is connected to at least one shaft that is guided by guide means secured to the housing, with the shaft being secured to a crosspiece; furthermore, the actuating mechanism includes two or more hydraulic, double-acting cylinders that are disposed to the side of the charging hopper and are distributed about the shaft or shafts of the floating weight, with one end of the cylinders being secured to the crosspiece and the other end of the cylinders being secured to the mixer housing or to the charging hopper so as to provide a certain amount of flexibility.

By disposing the cylinders to the side of the charging hopper, the overall structural height can be reduced. Furthermore, the internal mixer can be embodied in such a way that the movable crosspiece is the uppermost structural element. If it should become necessary to provide for transverse transport, the internal mixer can then "duck".

The advantageous symmetrical arrangement of the cylinders reduces in itself the danger of swinging or tilting of the pistons and piston rods; furthermore, imperfections in manufacturing or faulty guidance of the floating weight as a result of material that has become stuck can be compensated for by the movable connection between the cylinders and the crosspiece.

Pursuant to a second aspect of the invention, the hydraulic control mechanism includes an inlet line for the supply of hydraulic fluid, an outlet line for the withdrawal of hydraulic fluid, a first operating line for the downward movement of the floating weight, a second operating line for the upward movement of the floating weight, a connecting line between the operating lines, a drain line for the throttled return of hydraulic fluid, a secondary pressure reservoir, a first pressure reservoir connected to the inlet line, a second pressure reservoir connected to the secondary suction line, as well as valve means for connecting and blocking the lines relative to one another and to set the operating conditions "upward movement of the floating weight", "downward movement of the floating weight", "retention of the floating weight in the upper position", "retention of the floating weight in the lower position", i.e. "mixing operation position"; when the valve means are in a mixing operation position, the secondary suction line is connectable to the second operating line via the second pressure reservoir, while the first operating line communicates with the first pressure reservoir. As a result, the cylinder pistons, which separate the piston chambers for the downward movement, i.e. the feeding movement, from the piston chambers for the upward movement, i.e. the return stroke, are hydraulically held or restrained, yet with a resilience as is provided by the pressure reservoirs with their gas bubbles. As a result, the hydraulic system exhibits elastic qualities that lead to an adequate, resilient retention of the floating weight in the charging hopper. Consequently, during operation of the internal mixer, the floating weight presses with a yielding force upon the material that is to be mixed and can retreat if the localized pressure in the mixing chamber becomes too great.

BRIEF DESCRIPTION OF THE DRAWINGS

Specific embodiments of the invention will be described in conjunction with the drawing illustrations as follows.

DESCRIPTION OF PREFERRED EMBODIMENTS

Figure 1:
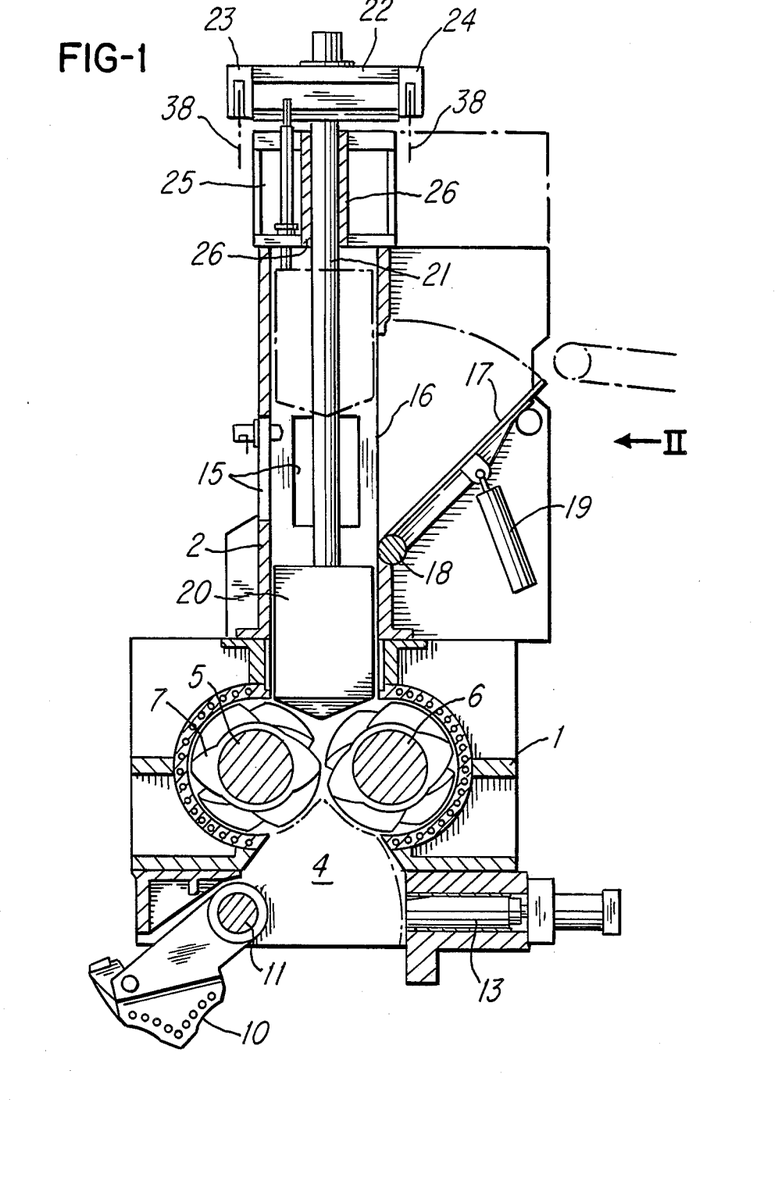
FIG. 1 is a longitudinal cross-sectional view through an internal mixer.
Figure 2:
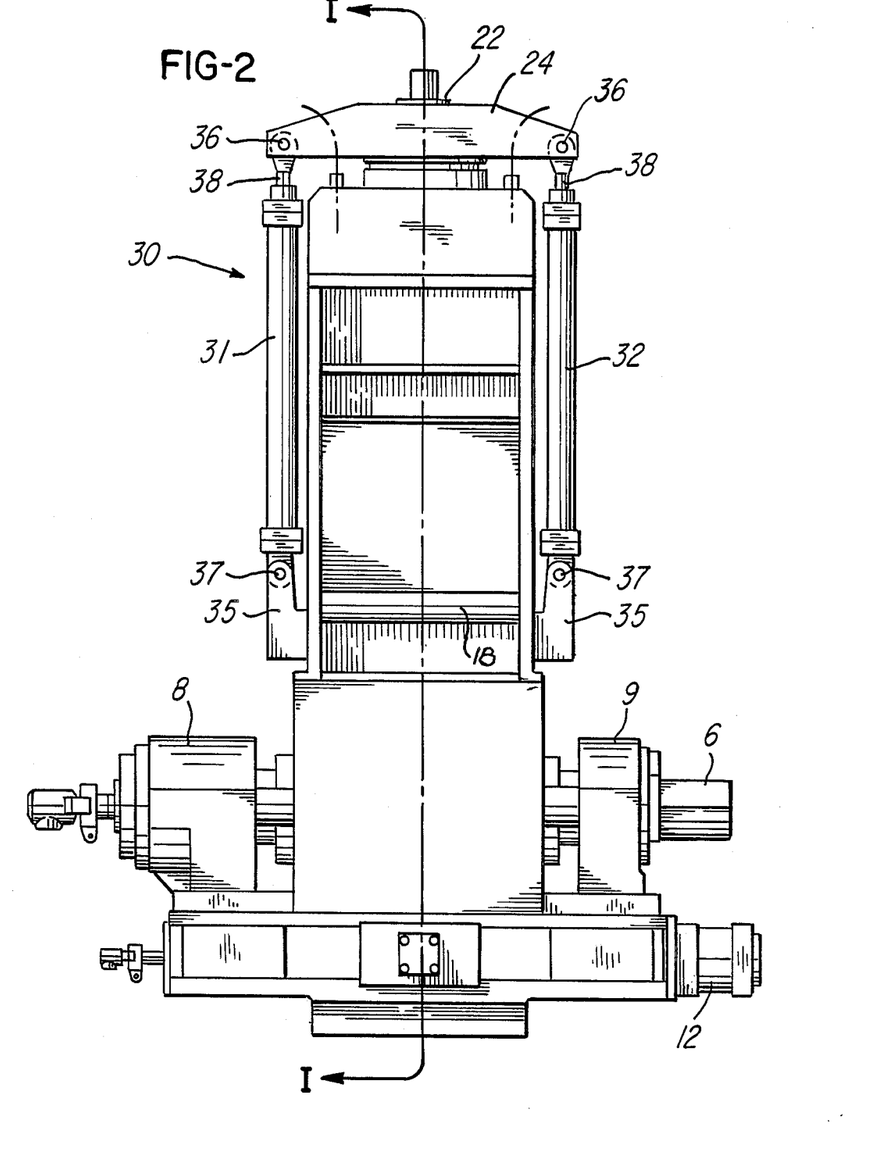
FIG. 2 is a side view taken in the direction of arrow II in FIG. 1.
Figure 3:
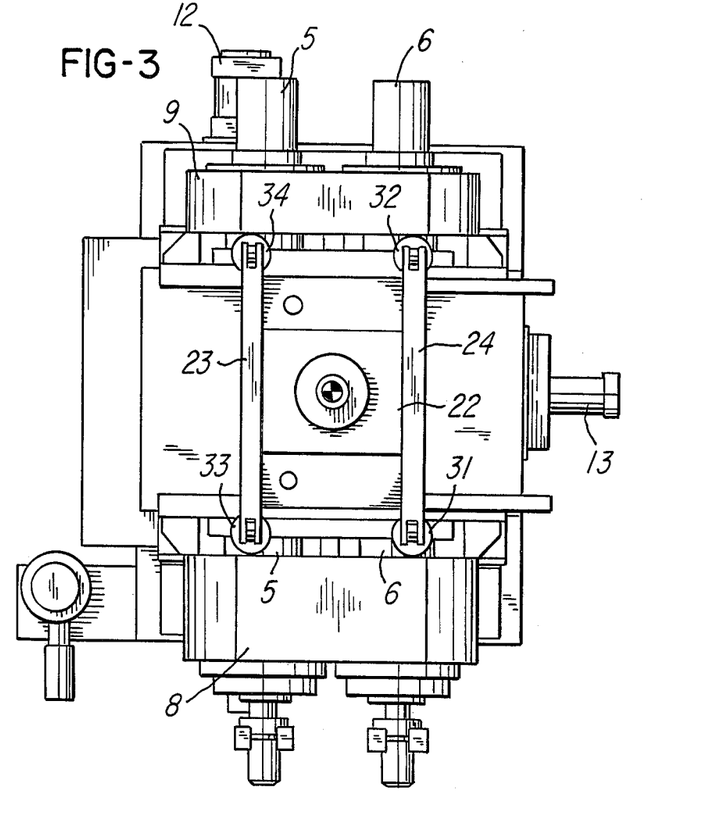
FIG. 3 is a view from above.

As structural parts of a housing, the internal mixer illustrated in FIGS. 1 to 3 comprises a mixer housing 1 and a charging hopper 2. The mixer housing 1 is provided with a charging opening 3 and a discharge outlet 4; furthermore, axial holes are provided for the passage of two mixer shafts 6 and 7 that in turn are provided with mixing or kneading blades or paddles 7. The mixer shafts 5 and 6 are mounted externally of the mixer housing 1, with the appropriate support or bearing housings 8 and 9 being visible in FIGS. 2 and 3. The discharge outlet 4 is normally closed off by a pivotable saddle 10 that can be pivoted into and out of the outlet opening 4 via a shaft 11 and a motor 12. The pivotable saddle 12 is held in its closed position by a bolt or similar securing element 13.

The hopper 2 has a rectangular cross-sectional shape; in other words, it has two wide sides and two narrow sides. Provided in the hopper are access openings 15 and a filling or charging opening 16, which are normally closed. The charging opening 16 is provided with a lid or cover 17 that can be pivoted about a shaft 18 via a cylinder 19 in order to function in the open position as a slide or chute when the material that is to be mixed is fed or charged via conveying means, which is indicated by a dot-dash line. The access openings 15 can be used for supplying additives.

The interior of the hopper 2 is embodied as a guide means for a press or floating weight 20, the shape of which corresponds to a cuboid or dice-shaped configuration on which is placed a roof, with the roof shape being such that it points downwardly. The floating weight 20 is connected to a shaft 21, the upper end of which is secured in a crosspiece 22. Two traverse or transverse supports 23, 24 are mounted on the crosspiece 22. The upper end of the hopper 2 is covered by a closing and support housing 25 in which is accommodated a sleeve bearing 26 for the shaft 21 of the floating weight, as well as sensing mechanisms for the position of the floating weight 20. The latter can be hydraulically moved between its upper position 20, which is indicated by dot-dash lines, and its lower position, which is shown by solid lines with the actuating mechanism also making it possible for the floating weight to occupy intermediate positions.

The hydraulic actuating device 30 is provided with four symmetrically arranged cylinders 31 to 34, the ends of which are connected with a certain flexibility to the crosspiece 22 and to extensions 35 of the hopper 2. The flexibility of simple joints 36 and 37 is sufficient. The illustrated arrangement of the piston rods 38 at the top, i.e. the connection of the piston rods 38 via the joints 36 to the crosspiece 22, is preferred, since in this manner the supply of hydraulic fluid to the piston chambers of the cylinders 31 to 34 can be effected via the stationary cylinder housing. It should be noted that the floating weight 20 (FIG. 1), in the illustrated "ducked" or lowered position of the crosspiece 22, assumes its ready-to-mix position, in which an elastic resilience is provided, as will be described below. When hydraulic fluid is supplied to the cylinders 31 to 34, the pistons rod 38 are extended, whereupon the crosspiece 22 then assumes a position that would be above the edge of the drawing sheet in FIGS. 1 and 2.

Figure 4:
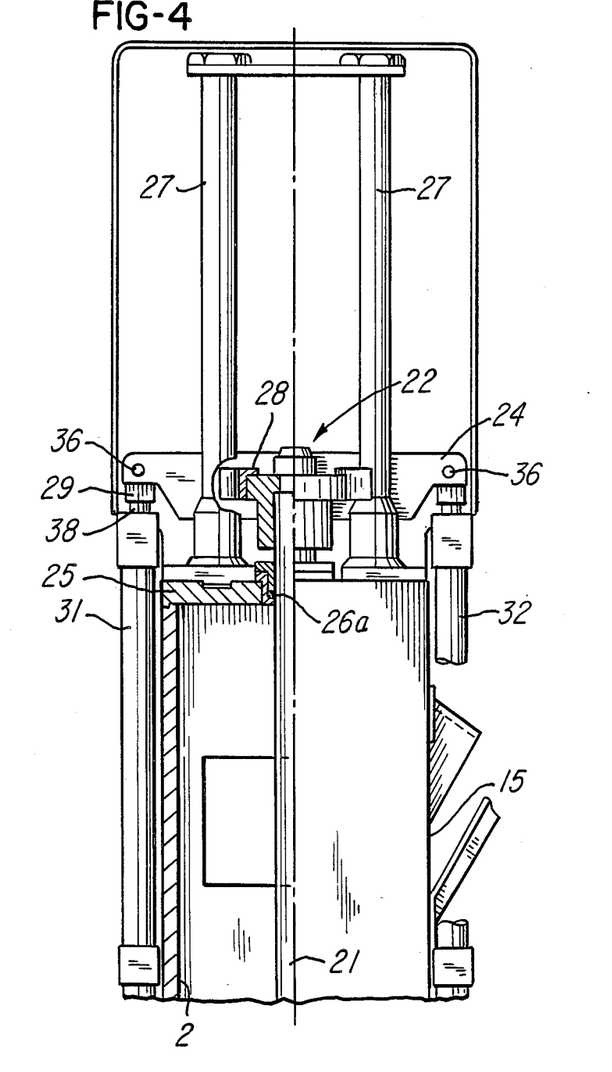
FIGS. 4 and 5 are longitudinal cross-sectional views through the upper end of an alternative internal mixer.
Figure 5:
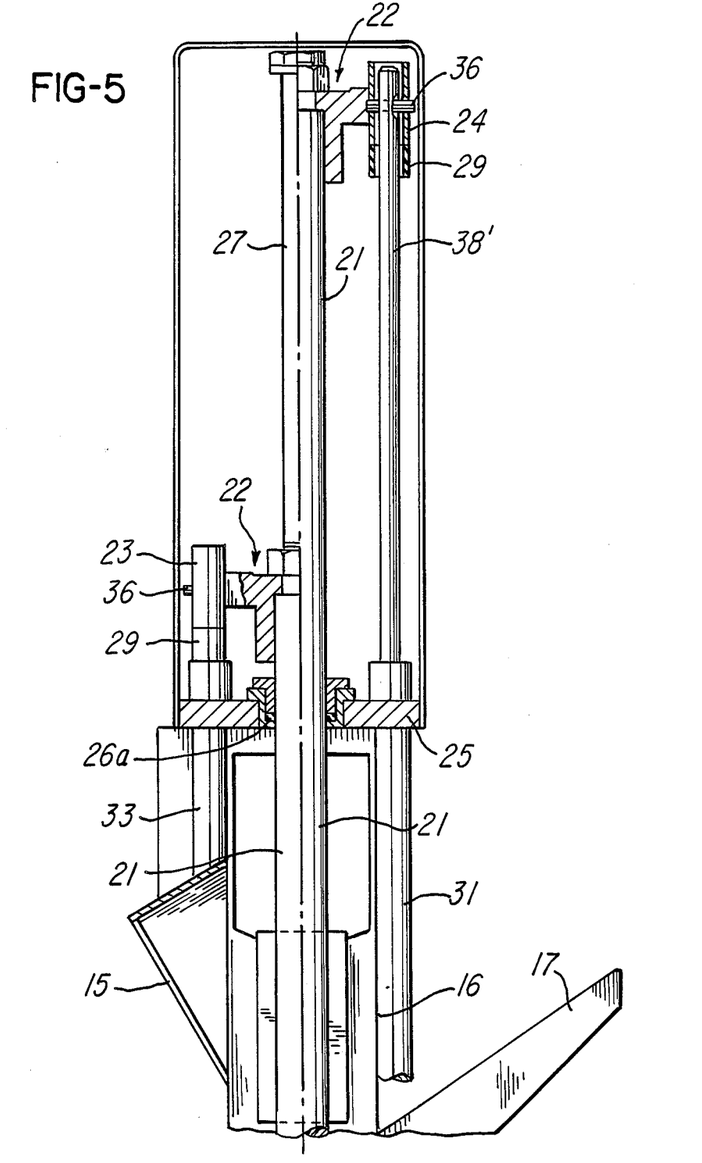

FIGS. 4 and 5 show an alternative inventive embodiment of the internal mixer in the region of the crosspiece 22. Those structural elements that correspond to the embodiment of FIGS. 1 to 3 are provided with the same reference numerals. Only the sleeve bearing 26 for the shaft 21 of the floating weight 20 differs from the previously described embodiment. The illustrated construction contains two guide rods 27 and half sleeves 28 that are supported on the inner sides of the guide rods 27 and can be addressed as part of the crosspiece 22. A packing sleeve 26a of the support housing 25 fulfills the sealing function relative to the hopper 2. Rubber buffers 29 are disposed between the support housing 25 and the crosspiece 22, and serve to absorb the impacts that occur during the downward stroke. The upper position of the piston rods is indicated by the reference numeral 38' in FIG. 5. Due to the upwardly projecting guide rods 27, the construction of FIGS. 4 and 5 is not as compact as the construction of FIGS. 1 to 3; a certain compensation is achieved in that only a short length is required for the packing sleeve 26a, and the half sleeves 28 are disposed within the overall height of the crosspiece 22. Thus, the overall height is less than that of the heretofore known arrangement (DE 34 26 442 Cl), since no cylinder is provided having supply and withdrawal of hydraulic fluid via the piston rod, so that the extension length of the cylinder in relation to its overall length in the retracted state is more favorable.

Figure 6:
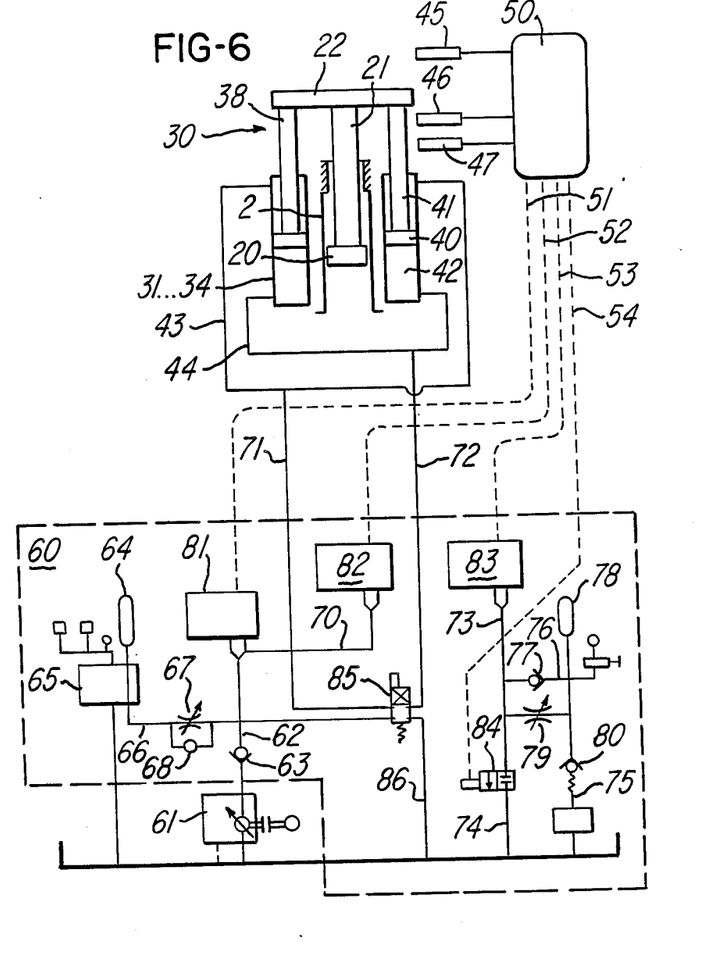
FIG. 6 is a view showing hydraulic circuit diagram.

FIG. 6 shows the inside of the hydraulic actuating device 30. Each of the cylinders is provided with a piston 40, an annular piston chamber 41, and a cylindrical piston chamber 42. The annular piston chambers 41 are interconnected via first distribution lines 43, and the cylindrical piston chambers 42 are interconnected via second distribution lines 44. Sensing mechanisms for the position of the floating weight 20, in the form of light barrier units, are indicated by the reference numerals 45, 46, and 47, and are connected to an electronic control mechanism 50 that in turn is connected via control lines 51 to 54 with a hydraulic control mechanism 60.

A hydraulic pump 61 having variable displacement volumes is connected to the hydraulic control mechanism 60 via an inlet line 62 in which is disposed a check valve 63, so that the hydraulic fluid that is necessary for operating the apparatus can be supplied. A first pressure reservoir 64 which is provided with a pressure regulating mechanism 65, is connected to the inlet line 62 via a line 66, which contains a flow regulating mechanism 67 and a check valve 68, which are connected and parallel to one another. The flow regulating mechanism 67 could be a simple throttle valve. A connecting line 70 connects a first operating line 71 with a second operating line 72, and leads to a common line section 73 from which branch off an outlet line 74, a drain line 75, and a secondary suction line 76. The latter is provided with a check valve 77, and leads to a second pressure reservoir 78, which can be charged from the common line section 73 via a flow regulating mechanism 79 that is connected in parallel to the check valve 77. The flow regulating mechanism 79 also connects the common line section 73 with the drain line 75, in which is disposed a check valve 80 that has an adjustable opening pressure of, for example, 4 bar.

A first remotely controllable valve 81 connects the inlet line 62 to the connecting line 70. A second remotely controllable valve 82 is disposed in the connecting line 70 between the first and second operating lines 71, 72. A third remotely controllable valve 83 establishes the connection between the connecting line 70 and the common line section 73. A fourth remotely controllable valve 84 is disposed in the path of the outlet line 74 and makes it possible to open or close the latter. Finally, a fifth remotely controllable valve 85 is also provided that makes it possible to connect the inlet 62 with the second operating line 72, and the first operating line 71 with an outlet line 86. The valves 81, 82, 83 are designed as seat valves in order to control large passage cross sections. The control of the valves 81, 82, 83 is preferably effected by an electrically controllable pilot or preliminary stage.

The method of operation of the hydraulic circuit illustrated in FIG. 6 is as follows:

To move the floating weight 20 upwards (return stroke), the valves 81 and 82 are opened, so that the pump 61 pressurizes both of the operating lines 71 and 72 via the inlet line 62 and the connecting line 70. However, since the piston surface in the region of the piston chambers 42 is greater than in the region of the piston chambers 41, the differential pressure against the pistons 40 leads to an upward movement of the pistons and piston rods. The hydraulic fluid displaced from the piston chambers 41 passes via the lines 43, 71, and 70 into the operating line 72; in other words, the upward stroke is effected relatively rapidly.

To move the floating weight 20 downwards (forward stroke), the valves 81, 83, and 84 are opened, so that hydraulic fluid can be supplied via the operating line 71 and can be withdrawn via the operating line 72. When the floating weight 20 has approached its lower position, the position sensor 46 is actuated, and the electrical control circuit 50 closes the valve 84 via the control line 54. As a result, the hydraulic flow escaping from the piston chambers 42 can flow off only via the throttle or flow regulating mechanism 79, in which connection the opening pressure of 4 bar of the check valve 80 must be overcome. The floating weight 20 thus approaches its lower end position very slowly. The end position itself is determined by the position sensor 47.

In this end position, the variable pump 61 is shifted to zero stroke. At the same time, the pistons 40 are hydraulically held, since in the piston chambers 41 the pressure of the reservoir 64 exists, and in the pressure chambers 42 the pressure of the reservoir 78 exists. However, this holding or restraining is not inflexible, since the reservoirs exhibit a certain elastic resiliency. If then during the mixing process a force acts upon the floating weight 20 from below that is greater than the hydraulic force from the pressure reservoir 64, the floating weight 20 can retreat upwardly, whereby the displaced hydraulic fluid flows back into the reservoir due to the fact that the check valve 63 is blocked. If thereupon the mixing process leads to a release of pressure in the mixing chamber, the floating weight 20 returns to its lower position. It is to be understood that during these processes, the hydraulic fluid column in the piston chamber 42 and the operating line 72 is displaced into the reservoir 78 via the flow regulating mechanism or throttle 79, whereas the return flow into the piston chamber 42 is effected via the secondary suction line 76 and the check valve 77. The ability of the pressure reservoirs 64 and 78 to receive fluid is effective upon the floating weight 20 as a shock absorber or buffer, so that during greater loads resulting from the mixing process, the floating weight retreats elastically and is again returned to its position. This is advantageous for the mixing process.

The valve 85 makes it possible to raise the floating weight 20 in emergency situations. This is because the inlet line 62 can be connected directly to the second operating line 72, while the first operating line 71 can be connected with the additional outlet 86. In such a situation, the seat valve 82 closes automatically due to its construction, since the opening pressure supplied via the connecting line 70 would not be present.

It is to be understood that the hydraulic circuit could be modified and still be within the scope of the present invention. For example, it is not necessary that the valves 83 and 84 be connected in series; rather, a parallel connection is also possible, since the functions "rapid downward movement" and "downward movement at slow speed" as well as "mixing operation position of the floating weight" are successively established, and it would be possible for these functions to provide in each case a separately controllable valve.

The present invention is, of course, in no way restricted to the specific disclosure of the specification and drawings, but also encompasses any modifications within the scope of the appended claims.

What we claim is:

1. In an internal mixer having a mixer housing in which are disposed mixing means and which has a charging opening that can be closed off by a floating weight, with a charging hopper being placed on said charging opening and being provided with at least one closeable filling opening, and with said floating weight being guided in an upwardly and downwardly slidable manner in said hopper, and being movable between various positions in said hopper via a hydraulic actuating mechanism that includes pistons, piston rods, and piston chambers, with a hydraulic control mechanism being associated with said hydraulic actuating mechanism, the improvement wherein:

said floating weight is connected to shaft means that is guided by guide means secured to said housing, with said shaft means being secured to a movable crosspiece; and said hydraulic actuating mechanism includes only four hydraulic, double-acting cylinders for respective ones of said pistons, with said cylinders being disposed to the side of said hopper, and being symmetrically distributed about said shaft means of said floating weight, and with said cylinders each having two ends, with one end of each cylinder being secured to said crosspiece, and the other end of each cylinder being secured to one of said mixer housing and said hopper in such a way as to provide a certain amount of flexibility; said crosspiece includes two transverse supports, and said hydraulic actuating mechanism includes four hydraulic, double-acting cylinders that are connected in a paired manner to said traverse supports so that considerable forces acting upon the floating weight cannot lead to any swinging and tilting of said hydraulic actuating mechanism which thus avoids wear on said guide means and allows a lower overall installation height;

said hopper having a rectangular-shaped configuration; and including a hydraulic cylinder means respectively at each of four corners of said rectangular-shaped charging hopper, said charging hopper at all four sides thereof respectively having a charging opening.

2. In an internal mixer having a mixer housing in which are disposed mixing means and which has a charging opening that can be closed off by a floating weight, with a charging hopper being placed on said charging opening and being provided with at least one closeable filling opening, and with said floating weight being guided in an upwardly and downwardly slidable manner in said hopper, and being movable between various positions in said hopper via a hydraulic actuating mechanism that includes pistons, piston rods, and piston chambers, with a hydraulic control mechanism being associated with said hydraulic actuating mechanism, the improvement wherein:

said floating weight is connected to shaft means that is guided by guide means secured to said housing, with said shaft means being secured to a movable crosspiece; and said hydraulic actuating mechanism includes at least two hydraulic, double-acting cylinders each having one of said pistons therewith, with said cylinders being disposed to the side of said hopper, and being symmetrically distributed about said shaft means of said floating weight, and with said cylinders each having two ends, with one end of each cylinder being secured to said crosspiece, and the other end of each cylinder being secured to one of said mixer housing and said hopper in such a way as to provide a certain amount of flexibility;

said hydraulic control mechanism includes an inlet line for the supply of hydraulic fluid, an outlet line for the withdrawal of hydraulic fluid, a first operating line connected to said actuating mechanism for downward movement of said floating weight, a second operating line connected to said actuating mechanism for upward movement of said floating weight, a connecting line between said first and second operating lines, a drain line for the throttled return of hydraulic fluid, a secondary suction line, a first pressure reservoir connected to said inlet line, a second pressure reservoir connected to said secondary suction line, and valve means to connect and block said inlet, connecting, operating, outlet, drain and secondary suction lines relative to one another and to set a number of operating conditions including "upward movement of said floating weight", "downward movement of said floating weight", "retention of said floating weight in the upper position", and "retention of floating weight in the lower position", i.e. the "mixing operation position"; when said valve means is in a mixing operation position, said second pressure reservoir is connectable to said second operating line via said secondary suction line, while said first operating line communicates with said first pressure reservoir.

3. An internal mixer according to claim 1, in which said valve means comprises a first valve for downward movement of said floating weight, a second valve for upward movement of said floating weight, a third valve for a combination control, and a fourth valve for opening aid outlet line; said first valve serves to selectively connect or block said inlet line and said first pressure reservoir with or relative to said first operating line; said second valve is disposed in said connecting line between said first and second operating lines; said third valve serves to selectively connect or block said outlet line, said drain line, and said secondary suction line with or relative to said second operating line; and said fourth valve is provided for actuation of one of said outlet and drain lines.

4. An internal mixer according to claim 3, which includes a line section that is associated with said outlet, drain, and secondary suction lines, with said third and fourth valves being successively disposed, in an outlet direction, in said line section.

5. An internal mixer according to claim 4, in which a check valve having a prescribed opening pressure is disposed in said drain line.

6. An internal mixer according to claim 4, which includes a first flow regulating mechanism that connects said first pressure reservoir to said first valve.

7. An internal mixer according to claim 6, which includes a second flow regulating mechanism that connects said line section with said second pressure reservoir and with said drain line.

8. An internal mixer according to claim 2, having a rectangular-shaped configuration of said charging hopper; and
including a hydraulic cylinder means respectively at each of four corners of said rectangular-shaped charging hopper.

9. An internal mixer according to claim 8, in which said charging hopper at all four sides thereof respectively has a charging opening.

* * * * *